United States Patent [19]

Swift

[11] Patent Number: 5,086,878

[45] Date of Patent: Feb. 11, 1992

[54] TOOL AND WORKPLACE LUBRICATION SYSTEM HAVING A MODIFIED AIR LINE LUBRICATOR TO CREATE AND TO START THE DELIVERY OF A UNIFORMLY FLOWING PRESSURIZED AIR FLOW WITH OIL, TO DELIVER THE OIL CONTINUOUSLY AND UNIFORMLY WHERE A METAL PART IS BEING FORMED

[76] Inventor: Steven M. Swift, 17822 Driftwood Dr., Sumner, Wash. 98390

[21] Appl. No.: 527,758

[22] Filed: May 23, 1990

[51] Int. Cl.$^5$ ............................................. F16N 7/30
[52] U.S. Cl. ................................... 184/55.2; 184/6.26
[58] Field of Search ...................... 184/55.2, 6.2, 6.23, 184/55.1, 6.26

[56] References Cited

U.S. PATENT DOCUMENTS

| 2,245,600 | 6/1941 | Medsker | 184/55.2 |
| 2,705,547 | 4/1955 | Gothberg et al. | 184/55.2 |
| 3,191,720 | 6/1965 | Stryker | 184/55.2 |
| 4,345,668 | 8/1982 | Gaunt | 184/29 |
| 4,353,435 | 10/1982 | Abrams et al. | 184/55.2 |

OTHER PUBLICATIONS

"Air Preparation Design Specification Handbook" Parker Fluidpower, 11/1988.
"Accu-Lube Div. Lubricating Systems, Inc." E. F. Bailey Co., 09/1988.
All-Lube; "A Third Generation High-Tech Liquid Dispenser" All-Lube Division.

Primary Examiner—Ira S. Lazarus
Assistant Examiner—Alan B. Cariaso
Attorney, Agent, or Firm—Roy E. Mattern, Jr.

[57] ABSTRACT

A lubrication system to lubricate tools and workpieces, where a metal part is being formed, to eliminate most of the friction, so little heat will be generated, and therefore coolants will not be required, centers on the modification of an air line lubricator, originally designed for internally lubricating compressed airflow driven pneumatic tools. The modification commences with the installation of an oil and overall pressurized airflow pick up passageway structure being arranged within the housing of the air line lubricator, having a continuous uniform diameter, to direct the oil and overall pressurized airflow from near the bottom of a pre-departure mixing basin, up to the pressurized air exit of the housing, and then through this pressurized air exit of this then modified air line lubricator. The continuation of a passageway for the oil and the pressurized airflow remains at the continuous uniform diameter beyond the pressurized air exit of the housing, through valves, tees, and into the entries of respective nozzles. This continuous uniform diameter of the passageway thereby avoids any build up of oil in puddles, which would othterwise possibly prevent the uniform continuous delivery of oil to adequately lubricate the place, where a metal piece is being formed by the moving contact of a forming tool, and also thereby avoids any large delivery of oil, or alternately no delivery of oil, if the modified air line lubricator is accidentally tipped when in operation.

20 Claims, 4 Drawing Sheets

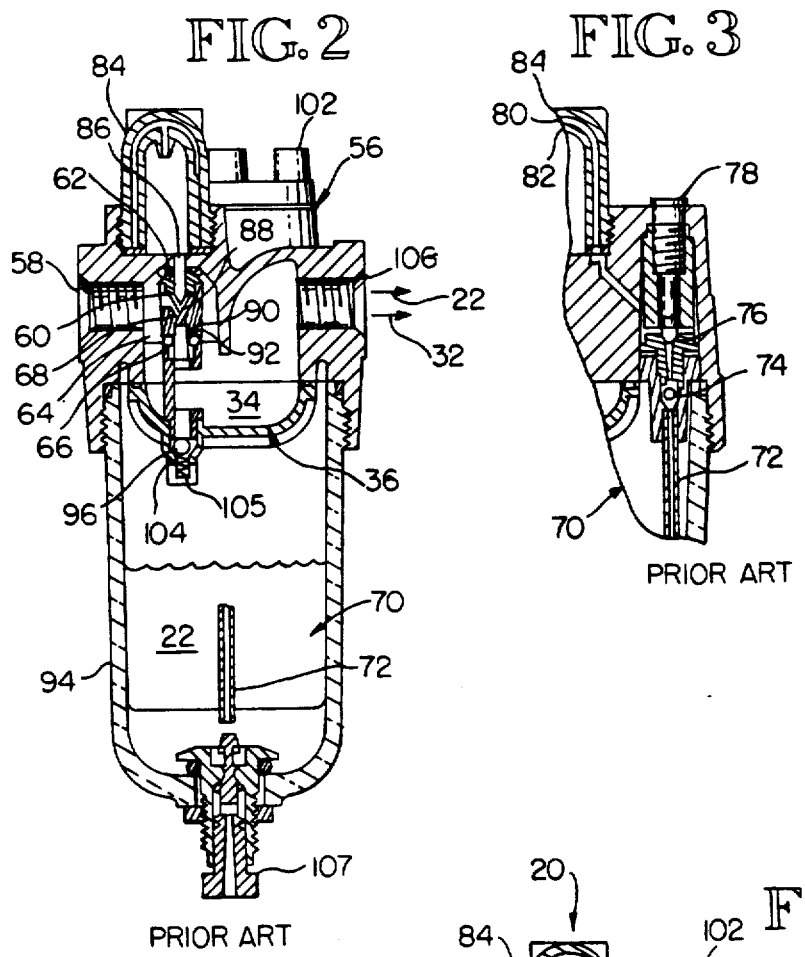
FIG. 2
FIG. 3 PRIOR ART
PRIOR ART
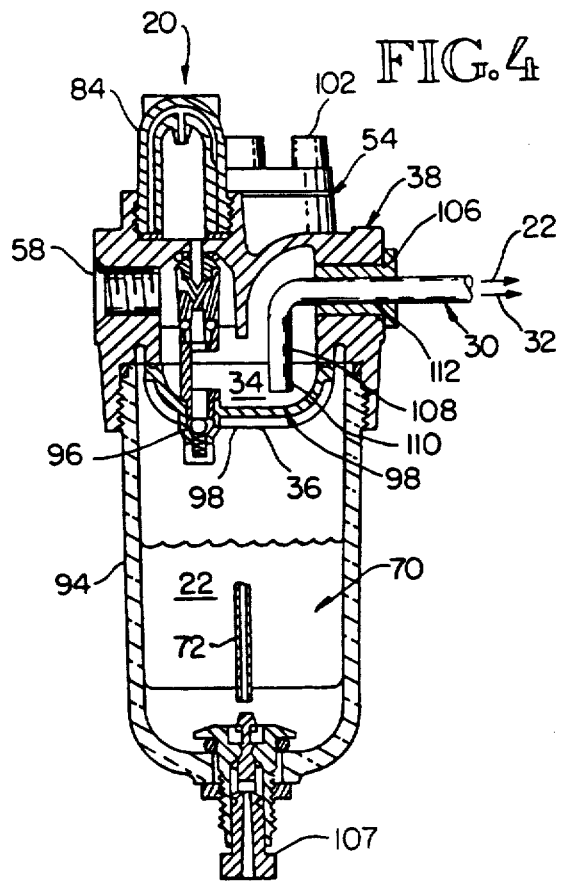
FIG. 4

TOOL AND WORKPLACE LUBRICATION SYSTEM HAVING A MODIFIED AIR LINE LUBRICATOR TO CREATE AND TO START THE DELIVERY OF A UNIFORMLY FLOWING PRESSURIZED AIR FLOW WITH OIL, TO DELIVER THE OIL CONTINUOUSLY AND UNIFORMLY WHERE A METAL PART IS BEING FORMED

BACKGROUND

Several years ago in the aircraft industry, to avoid the many problems associated with recirculating coolants used during metal forming operations, a lubricant was developed for direct application to a cutting tool, just before the cutting portions thereof were commencing their cutting functions, to eliminate most of the friction. Consequently, little heat was generated, and therefore no recirculating coolants were required. This lubricant is derived from a vegetable base making the lubricant an ecologically clean product, non-toxic, non-allergenic, and non-polluting.

Applicators were developed to deliver this lubricant to the cutting tools. Some of such applicators are illustrated and described in U.S. Pat. No. 4,345,668. The "Accu-Lube" division of Lubricating Systems, Inc. supplies such lubricants and applicators. In some embodiments of these applicators the person operating the forming machinery selects the respective settings for an air supply and a lubricant supply. These respective supplies are separately directed to the locale where a cutting tool, for example, is about to begin forming a workpiece into a metal product, or a portion thereof. The lubricant is supplied in intermittent pulsed portions. If the compressed air supply is increased, the lubricant supply is independently increased, and vice versa.

Although these applicators are being used very effectively, they are considered to be relatively expensive. Moreover, the independent adjustments of both the pressurized air supply and pumped lubricating oil supply generally must be made at or on these applicators, where they are mounted, rather than being able to make such adjustments at the location of the tool, where the forming cut is being made. Also, because the lubricating oil is delivered via pulsed pumping operations, there are brief time periods, when an insufficient quantity of lubricating oil is available to keep the friction level down low enough to avoid a temporary unwanted period of a buildup of heat, where the metal forming operation is being undertaken.

SUMMARY

To deliver this vegetable base lubricating oil to a cutting tool, at the location just prior to where the cutting is being undertaken, in a steady stream, through one passageway, which directs both this lubricating oil and the conveying pressurized airflow thereof, this lubrication system has been developed. The development was undertaken by first observing the function and arrangement of the interior of an air line lubricator, designed for internally lubricating pressurized airflow driven pneumatic tools. Such an air line lubricator is designated as a "Parker" fluid power mist air line lubricator.

Thereafter, changes were made to create this lubrication system. The interior of an air line lubricator is changed in respect to the pre-departure mixing basin, by adding within this basin, or by modifying this basin, to create a lubricating oil and overall pressurized airflow pickup passageway structure, having a continuous uniform diameter. This passageway structure receives the combined lubricating oil and overall pressurized airflow near the bottom of the pre-departure mixing basin, and then directs this combined flow up to the pressurized air exit of the housing, and then through the pressurized air exit of this principal portion of this lubricating system.

In an overall installation of this lubricating system, the passageway structure is continued at this same uniform diameter, through fittings, valves, tees, fastening means, until reaching the entries of respective nozzles, directing a respective combined flow, for example, to a drill. In tees, inside spiral grooves are utilized to swirl this combined flow before the division thereof, which tends to more uniformly divide this combined flow where two nozzles, rather than one nozzle, are utilized in directing respective combined flows to respective specific locations, such as on opposite sides of a rotating saw blade.

A valve is located at a nozzle location, or near by, within the convenient reach of a machine tool operator for opening and closing, to control the supply time of this combined flow of lubricating oil and the overall pressurized airflow. When any flow rate changes are to be made in supplying these combined flows, the pressurized airflow only is changed, and the lubricating oil flow automatically changes in essentially the desired ratio of lubricating oil flow quantity to the overall pressurized airflow quantity.

By utilizing the same uniform diameter throughout all passageways directing this combined flow of the lubricating oil and the overall pressurized airflow from the pre-departure mixing basin to the entries of respective nozzles, there is no possibility of puddles being formed of lubricating oils during their delivery to the metal forming locales. Moreover, if the principal portion of this lubricating system is ever unwantedly tipped during the supply time of this combined flow, there is essentially no unwanted change in the flow rates of the lubricating oil and the overall pressurized airflow. There will not be surges during the lubricating oil delivery time, ranging from a no lubricating oil delivery period, to an excessive lubricating oil delivery period.

DRAWINGS

The lubrication system to lubricate tools and workpieces to eliminate most of the friction during the forming of metal parts, so little heat is generated and coolants are not required, in selected embodiments, is illustrated in the drawings, wherein:

FIG. 1 is a composite view drawn in a front elevation with portions thereof drawn perspectively, of an installation of an embodiment, illustrating: an airflow filter; an airflow regulator; a modified air line lubricator; compressed airflow and oil passageway; a control valve on a magnetic base; portions of a drill press, the drill thereof, and a workpiece; another compressed airflow and oil passageway surrounded by a flexible protective cover; and a nozzle to direct the oil and the compressed airflow to a tool just above a workpiece;

FIG. 2 is a vertical cross section taken through the middle, in a plane, of an air line lubricator before being modified;

FIG. 3 is a partial vertical cross section taken through the middle in another plane of an air line lubricator before being modified, and these portions thereof are not to be modified;

FIG. 4 is a vertical cross section taken through the middle, in the same plane, in reference to FIG. 2, of a modified air line lubricator;

Figure 5:
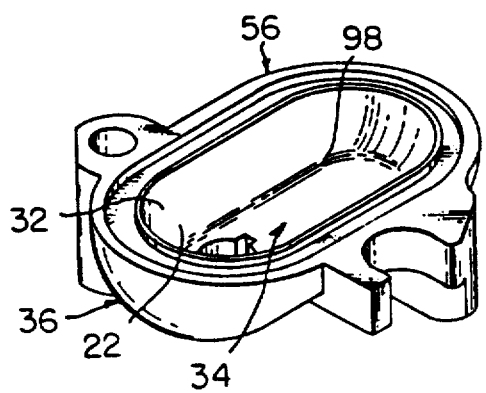
Figure 6:
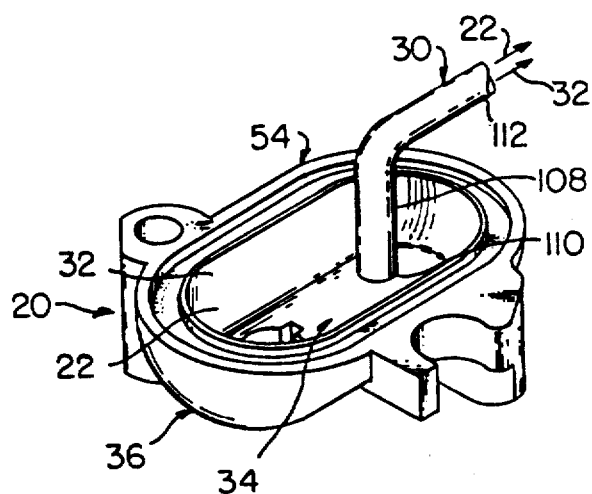
Figure 7:
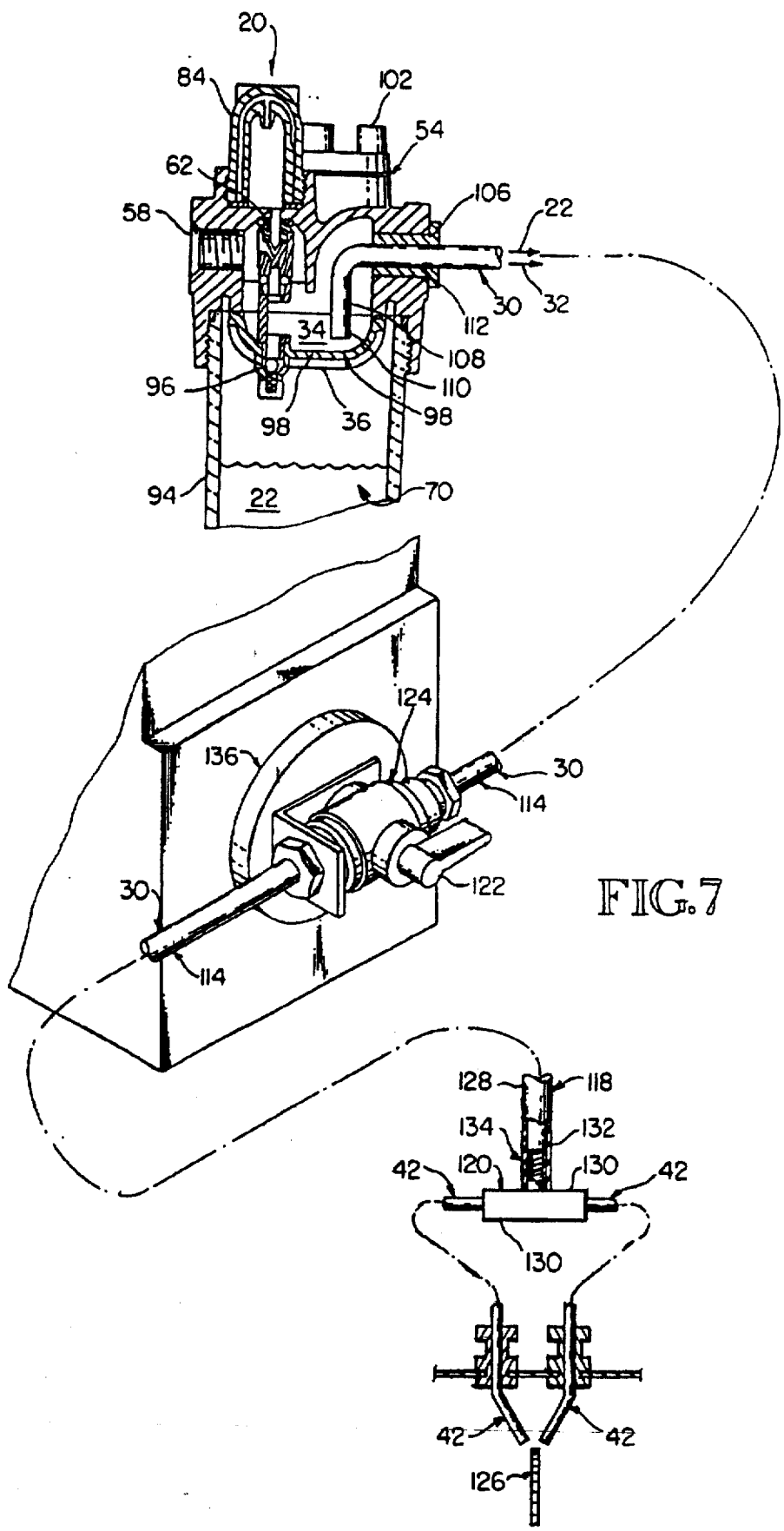

FIGS. 5 and 6 are partial perspective views looking down into respective pre-departure mixing basins, with FIG. 5 showing no modification, and FIG. 6 showing the modification of adding an oil and compressed airflow pick up passageway structure arranged within the housing of the modified air line lubricator, and having a continuous uniform diameter to direct the oil and compressed airflow from near the bottom of the pre-departure mixing basin up to the compressed air exit of the housing, and then through this compressed air exit of this then modified air line lubricator; and FIG. 7 is a composite view drawn in a front elevation with portions broken away, and with portions thereof drawn perspectively, of an installation of an embodiment, illustrating: the pre departure mixing basin at the top portion of the air line lubricator, as modified; the compressed airflow and oil passageway; a control valve; a tee having a rifled internal passageway; and two copper nozzles directing oil to opposite sides of a circular saw;

DESCRIPTION OF PREFERRED EMBODIMENTS

General Purpose of This Lubrication System

Figure 1:
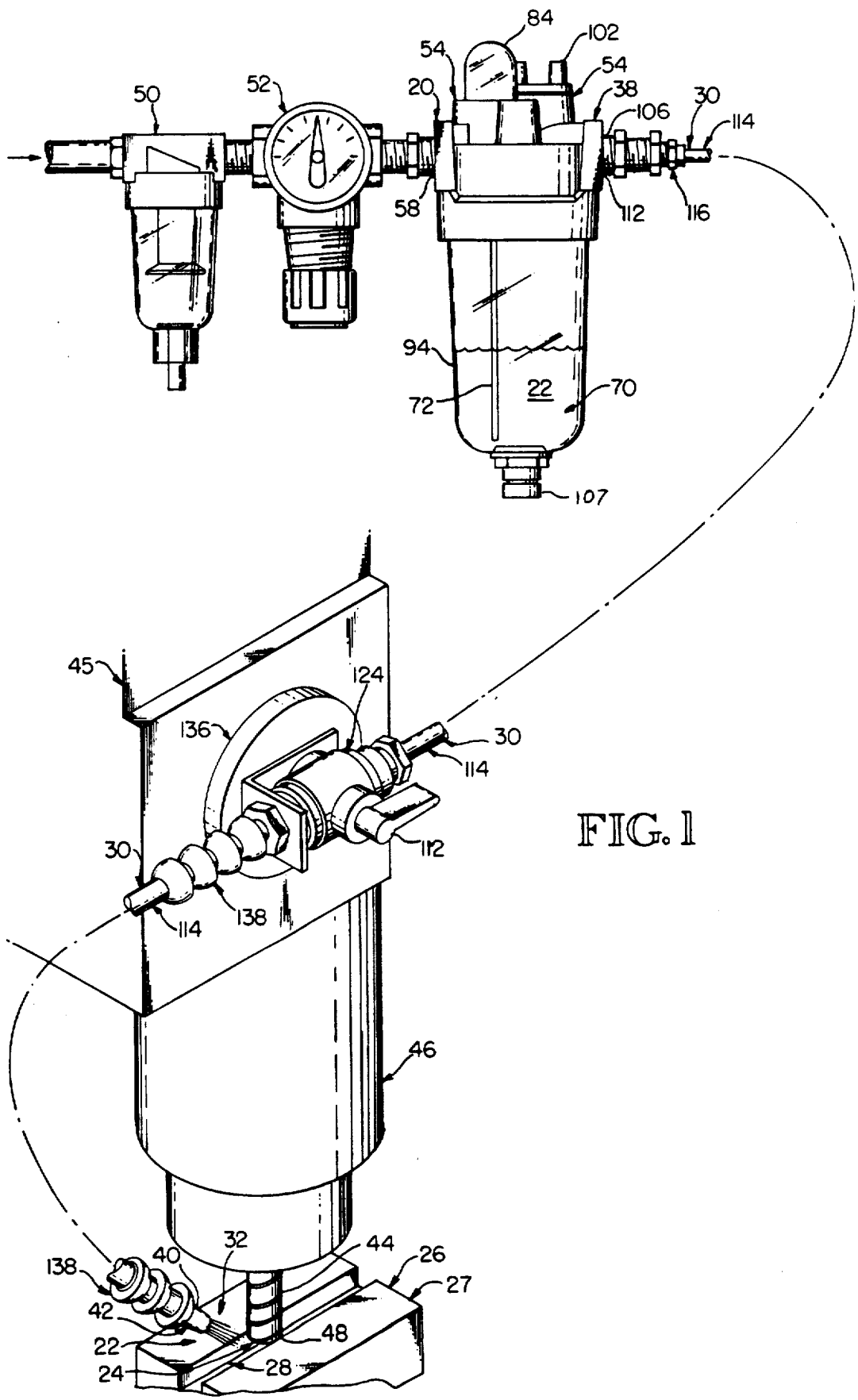

This lubrication system 20, delivering a vegetable base . lubricating oil 22 in a steady stream to a cutting tool 24 forming a work piece 26, at a location 28 just prior to where the cutting is being undertaken, is illustrated in various embodiments in the accompanying drawings. In all embodiments, as shown in FIGS. 1 and 5, the lubricating oil 22 is delivered via an overall passageway 30 of uniform diameter throughout, which directs both this lubricating oil 22 and the conveying pressurized airflow 32 thereof, from the source 34 thereof in a pre-departure mixing basin 36 of the principal portion 38 of this lubricating system 20, to respective entries 40 of respective nozzles 42. This continuous proper supply of lubricating oil 22 prevents any generation of excessive heat during the formation of metal parts.

An Embodiment Directing the Combined Flow of the Lubricating Oil and the Conveying Pressurized Airflow to a Single Nozzle Located Adjacent to a Single Cutting Tool Such as a Drill In FIG. 1, an embodiment of this lubrication system 20 is illustrated, which delivers a steady stream of vegetable base lubricating oil 22 to the entry 40 of a nozzle 42. Thereafter the lubricating oil 22 is specifically directed via the nozzle 42, to a cutting tool 24, which is a drill 44, of a machine tool 45, which is a drill press 46. The lubricating oil 22 is directed to a location 28 prior to the cutting locale 48, where the drill surfaces are engaging the surfaces of the work piece 26, which is to become a product 27, or part thereof.

In this selected embodiment shown in FIG. 1, an airflow filter 50 and an airflow regulator 52, not changed, are arranged upstream of the principal portion 38 of this lubricating system 20. This principal portion 38, is best referred to as being the equivalent of a modified air line lubricator 54. Such air line lubricators 56 are designed for internally lubricating pressurized airflow driven pneumatic tools.

How an Air Line Lubricator Functions

In respect to a "Parker" fluid power mist air line lubricator 56, and in referring to FIGS. 1, 2 and 3, incoming pressurized airflow at an entry 58, thereafter flows through the air line lubricator 56 in two paths at low airflow rates. In one path 60 the major airflow 60 is directed through a venturi section 62. In the other path 64 the minor airflow 64 slightly deflects a restrictor disc 66, and then flows by this restrictor disc 66.

The velocity of the major airflow 60 through the venturi section 62 creates a pressure drop at the throat section 68. This lower pressure allows lubricating oil 22 to be forced from the reservoir 70, through a pickup tube 72, past the check ball 74, to the metering block assembly 76, as shown when viewing FIGS. 1, 2, and 3. In this metering block assembly 76, the rate of flow of the lubricating oil 22 is adjusted by turning a metering screw 78. When this metering screw 78 is turned counterclockwise the flow rate is increased and vice versa.

As shown in FIGS. 2 and 3, the lubricating oil 22 leaving the metering block assembly 76, then flows through the clearance space 80 between an inner sight dome 82 and an outer sight dome 84. In this clearance space 80, drops 86 of lubricating oil 22 are formed. These drops 86, thereafter, drip into the throat section 68. Then in this throat section 68, the lubricating oil drops 86 are broken into fine particles 88 and mixed with the swirling major airflow 60. This mixture 90 goes to the venturi outlet 92 of the venturi section 62, and upon leaving this outlet 92 joins the minor airflow 64, which previously has passed by the restrictor disc 66.

When the incoming pressurized airflow at the entry 58 is increased, the restrictor disc 66 deflects more allowing a greater part of the additional airflow to bypass the venturi section 62 in the other path of the minor airflow. This further deflection of the restrictor disc 66 increasing the bypassing airflow assures the lubricating oil delivery rate increases linearly with this increased overall pressurized airflow rate. The check ball 74 in the pickup tube 72 assures that when there is no lubricating oil flow, the lubricating oil 22 in the pickup tube 72 will not return to the reservoir 70.

As shown in FIG. 2, the bowl 94 serving as the major component of the reservoir 70 can be filled under pressure due to the action of the check ball 96 located in the bottom 98 of the pre-departure mixing basin 36. When the lubricating oil fill cap 102 is removed, the pressurized air in the bowl 94 escapes. Thereafter, the air pressure in the pre-departure mixing basin 36 forces the check ball 96 to nearly seal at valve seat 104 thereof. When the lubricating oil fill cap 102 is replaced, the small amount of airflow past the check ball 96 builds up pressure. Then together, this build up pressure and the force of a spring 105, force the check ball 96 away from the valve seat 104. Thereafter the full line air pressure is reached within the bowl 94, and consequently within the reservoir 70.

The major airflow 60 carrying the lubricating oil 22 joins the minor airflow 64, as their respective flow paths meet in the pre-departure mixing basin 36. Thereafter this overall flow of lubricating oil 22 and pressurized airflow 32 leave the air line lubricator 56 through the exit 106. This overall flow leaving these mist air line lubricators 56 is directed to pressurized airflow driven pneumatic tools to insure their internal lubrication during their operational times.

If at any time the lubricating oil 22 in the oil reservoir bowl 94 is to be drained, the drain 107 at the bottom of this oil reservoir bowl 94 is opened.

How the Air Line Lubricator is Modified to Become the Principal Portion 38 of This Lubrication System To be assured that the lubricating oil 22 and the pressurized airflow 32 which are mixed together and leaving the exit 106 of principal portion 38 of this lubricating system 20 will always be essentially unaffected, either by any unwanted tilting of this principal portion 38, or by any unwanted abrupt rapid changes to higher pressures of the incoming pressurized air, one overall passageway 30 to receive and to guide the mixed lubricating oil 22 and the pressurized airflow 32 is commenced near the bottom 98 of the pre-departure mixing basin 36, as shown in FIGS. 1, 4, 5, and 7. This commencing portion 108 of this overall passageway 30 continues from the intake end 110 thereof to the exit 112 thereof, which is then at the exit 106 of this principal portion 38 of this lubricating system 20.

With this commencing portion 108 being in place, this principal portion 38 of this lubricating system 20, is recognized as being a modified air line lubricator 54, as particularly shown in FIGS. 4 and 6. With this commencing portion 108 not being installed, then this principal portion 38 of this lubricating system 20 is recognized as being similar to an air line lubricator 56, as particularly shown in FIGS. 2 and 5.

The Continuation of the One Overall Passageway Directing the Lubricating Oil and the Pressurized Airflow at the Same Diameter Throughout the Length Thereof As illustrated in FIGS. 1, 4, 6, and 7, the one overall passageway 30 remains at the same diameter throughout the length thereof. This insures that the proper mixture of the lubricating oil 22 and the pressurized airflow 32, which enters at the intake end 110 of the commencing portion 108 of this passageway 30, remains until their combined flow reaches the respective entry 40 of a respective nozzle 42, and so remains upon reaching the location 28 prior to the metal forming or cutting locale 48.

With respect to all the components used in creating this one overall passageway 30, all their internal diameters are ultimately made essentially the same size. These components are the hose 114 or tubing 114, straight connector fittings 116, directional change connector fittings 118, tees 120, and valves 122.

The Continuing Overall Passageway is Divided at a Tee to Continue on With Two Like Diameter Overall Passageways to Direct Lubricating Oil and the Pressurized Airflow to Two Nozzles As illustrated in FIG. 7, there are installations which require the delivery of the lubricating oil and the pressurized airflow, as a combined flow, at two nozzles 42, which are located on opposite sides of a circular saw 126. The same diameters are used in the overall passageway in respect to the entry 128 and exits 130 of the tee 120.

Providing Spiral Grooves in Tees and Possible Adjacent Fittings to Create a Swirling of the Combined Flow Before Dividing This Flow of Lubricating Flow and Pressurized Airflow As shown in FIG. 7, the tee 120 has spiral grooves 132 creating a rifled internal passageway 134. When the combined flow of the lubricating oil 22 and the pressurized airflow 32 passes through this tee 120, this combined flow is caused to swirl. Thereafter the division of this swirling combined flow is undertaken more readily and more evenly within this tee 120. If necessary, an adjacent fitting also with spiral grooves 132, not shown, is installed upstream of a tee 120, to commence the swirling action sooner to obtain the wanted division of the combined flow of lubricating oil 22 and the pressurized airflow 32.

Utilization of Available Components of Other Lubricating Systems

Wherever possible, available components of other types of lubricating systems are utilized, as shown in FIGS. 1 and 7. For example, in FIG. 1, a control valve 124 mounted on a magnetic base 136 is utilized. Also a flexible protective cover 138 is used to protect the overall passageway 30 between the control valve 124 and the nozzle 42.

Preferred Specifications of a Preferred Embodiment of This Lubrication System The principal portion 38 of this lubrication system 20 will essentially be sized very much like the "Parker" fluid power mist air line lubricator compact 06L series. The modifications centering on providing the commencing portions 108 of the overall passageway 30 will involve providing such portions 108 and the passageway 30 with an internal diameter preferably of one eighth of an inch in diameter. A three sixteenth inch diameter could be used. A one sixteenth inch diameter could be used. A one quarter inch diameter should not be used. Preferably the internal diameter of the passageways should be selected in the range of one sixteenth inch to three sixteenth inch. In using tapering nozzles the nozzle orifice preferably should be one sixteenth of an inch.

The operating range of the pressurized air, and therefore the operating range of the combined flow of lubricating oil 22 and the pressurized airflow 32 is preferably in the range of ten to twenty pounds per square inch. The minimum pressure is seven pounds per square inch, and the maximum pressure is forty five pounds per square inch.

A preferred flow rate of the lubricating oil 22, as observed at the sight domes 82, 84, is often three drops per minute. Noting that fifteen hundred drops generally comprise one ounce of lubricating oil 22, then at a rate of use of three drops per minute, an ounce of lubricating oil 22 will last during a continuous operation period of over eight hours, i.e. 8.33 hours.

I claim:

1. A lubrication system to lubricate tools and workpieces to eliminate most of the friction during the forming of metal parts, so little heat is generated and coolants are not required, wherein an air line lubricator, originally designed for internally lubricating compressed airflow driven pneumatic tools, is modified to create and to start the delivery of a pressurized airflow with oil, so the oil becomes the lubricant at a location where metal parts are being formed, comprising:

a) an air line lubricator, before modification, including the entire assembly thereof comprising: a housing; a compressed overall airflow entry thereof; a venturi portion thereof to receive, at low airflow rates, the majority airflow of this overall airflow along one path of the overall airflow; a throat section thereof where a pressure drop is created upon passage of this majority airflow; a pre-departure mixing basin thereof to receive the majority airflow; a compressed air exit thereof to receive and to pass the majority airflow out of this housing; an air receiving portion thereof to receive, at low airflow rates, the minority airflow of this overall airflow along another path of the overall airflow; a restrictor disc thereof which slightly deflects to allow this minority airflow to enter the pre-departure mixing basin and to continue on through the compressed air exit; an oil reservoir bowl thereof having an oil pickup tube and a check ball; an oil metering block thereof having a rotatable metering screw; inner and outer sight domes thereof having a clearance between them to view flowing oil, having an entry to receive oil from the metering block and an oil discharge exit by the throat section forming oil drops which drip into the throat section; an oil receiving entry thereof having a removable cap, for filling the oil reservoir bowl; a drain for the oil reservoir bowl; and a check ball subassembly thereof to seal off the oil reservoir bowl from the pressure of the compressed airflow through the housing, when the oil receiving entry is opened;

whereby this air line lubricator, before modification, is ready to receive oil in the oil reservoir bowl and when oil is so filled and the cap is replaced, and compressed air, at a low airflow rate, is directed into the overall airflow entry, the compressed air follows the two airflow paths, with the majority airflow meeting and carrying the oil drops at the throat section and then meeting the minority airflow in the pre-departure mixing basin, and thereafter the overall airflow with the oil leaves the air line lubricator; and b) an added modification structure installed in the housing of this air line lubricator to direct the compressed overall airflow and the oil carried within this overall airflow from the pre-departure mixing basin through the compressed air exit in a controlled delivery of the compressed airflow and oil in a continuous operation, which insures a continuity of this controlled delivery even through a tilting of the housing might occur, otherwise causing a tipping of the pre-departure basin, which otherwise would cause an over abundance of oil passing through the compressed air exit of the housing, or alternately no oil passing through this compressed air exit of the housing, and which insures a continuity of this controlled delivery even through an unwanted short delivery time of more overall compressed airflow might occur, comprising:

an oil and overall airflow pick up passageway structure arranged within the housing of the air line lubricator and having a continuous uniform diameter to direct the oil and overall airflow from near the bottom of the pre-departure mixing basin, up to the compressed air exit of the housing, and then through this compressed air exit of this then modified air line lubricator.

2. A lubrication system to lubricate tools and workpieces, as claimed in claim 1, comprising, in addition, a delivery passageway structure having the same uniform diameter of the oil and overall airflow pick up passageway structure installed in the housing of the modified air line lubricator, and a means to join these passageway structures to deliver the oil and overall airflow to a location of a tool and workpiece.

3. A lubrication system to lubricate tools and workpieces, as claimed in claim 2, comprising, in addition, a nozzle to direct the oil and overall airflow to a tool just above a workpiece surface, and a means to join this nozzle to the delivery passageway structure.

4. A lubrication system to lubricate tools and workpieces, as claimed in claim 3, comprising, in addition, a valve to start and to stop the flow of the oil and overall airflow leaving the delivery passageway structure before reaching the nozzle, and means at each end of the valve to join this valve to the nozzle and to the delivery passageway structure.

5. A lubrication system to lubricate tools and workpieces, as claimed in claim 4, wherein in claim 4, there is a nozzle, described in this claim 5 as being the first nozzle, comprising, in addition, a tee fitting secured to the valve to divide the flow of oil and the overall airflow leaving the valve, and a means to join this tee fitting to the valve, and two additional divisional passageway structures of equal diameter, to receive equal portions of the flow of oil and the overall airflow leaving the tee fitting, and means to join these two additional divisional passageway structures to the tee fitting, and a second nozzle to join with the first nozzle to direct the respective equal portions of the flow of oil and the overall airflow to a tool just above a workpiece surface, and means to join this second nozzle to one of the additional divisional passageways, the first nozzle and means thereof joining the first nozzle to the other additional divisional passageway.

6. A lubrication system to lubricate tools and workpieces, as claimed in claim 5, comprising, in addition, a rifle like spiral grooving structure in the tee fitting to cause the entering flow of oil and the overall airflow to flow in a spiral flow, which more uniformly and equally divides into the divided flows of oil and the overall airflow, which flow through the respective two additional divisional passageway structures.

7. A lubrication system to lubricate tools and workpieces, as claimed in claims 1, 2, 3, 4, 5, or 6, having a compressed air line filter assembly connected to the modified air line lubricator to filter the compressed air flow before the entry thereof into this lubrication system.

8. A lubrication system to lubricate tools and workpieces, as claimed in claims 1, 2, 3, 4, 5, or 6, having a compressed air line regulator assembly connected to the modified air line lubricator to regulate the compressed airflow before the entry thereof into this lubrication system.

9. A lubrication system to lubricate tools and workpieces, as claimed in claims 1, 2, 3, 4, 5, or 6, having the combined assembly of a compressed air line filter assembly and a compressed air line regulator assembly to filter the compressed air and to regulate the compressed air before the entry thereof into this lubrication system.

10. An added modification structure adapted for installation in the housing of a prior art air line lubricator, wherein this prior art air line lubricator comprises:

a housing; a compressed overall airflow entry thereof; a venturi portion thereof to receive, at low airflow rates, the majority airflow of this overall airflow along one path of the overall airflow; a throat section thereof where a pressure drop is created upon passage of this majority airflow; a pre-departure mixing basin thereof to receive the majority airflow; a compressed air exit thereof to receive and to pass the majority airflow out of this housing; an air receiving portion thereof to receive, at low airflow rates, the minority airflow of this overall airflow along another path of the overall airflow; a restrictor disc thereof which slightly deflects to allow this minority airflow to enter the pre-departure mixing basin and to continue on through the compressed air exit; an oil reservoir bowl thereof having an oil pickup tube and a check ball; an oil metering block thereof having a rotatable metering screw; inner and outer sight domes thereof having a clearance between them to view flowing oil, having an entry to receive oil from the metering block and an oil discharge exit by the throat section forming oil drops which drip into the throat section; an oil receiving entry thereof having a removable cap, for filling the oil reservoir bowl; a drain for the oil reservoir bowl; and a check ball subassembly thereof to seal off the oil reservoir bowl from the pressure of the compressed airflow through the housing, when the oil receiving entry is opened;

whereby this air line lubricator, before modification, is ready to receive oil in the oil reservoir bowl and when oil is so filled and the cap is replaced, and compressed air, at a low airflow rate, is directed into the overall airflow entry, the compressed air follows the two airflow paths, with the majority airflow meeting and carrying the oil drops at the throat section and then meeting the minority airflow in the pre-departure mixing basin, and thereafter the overall airflow with the oil leaves the air line lubricator; and wherein this added modification structure adapted for installation in the housing of this prior art air line lubricator, to direct compressed overall airflow and oil, which is carried within this overall airflow of this prior art air line lubricator from the pre-departure basin of this prior art air line lubricator, through a compressed air exit of the housing of this prior art air line lubricator, to thereby control the delivery of this compressed airflow and oil in a continuous operation, which insures a continuity of this controlled delivery of compressed airflow and oil, even though a tilting of the housing of this prior art air line lubricator might occur, otherwise causing a tipping of this prior art pre-departure basin, which otherwise would cause an over abundance of oil passing through the compressed air exit of the housing of this prior art air line lubricator, or alternately no oil passing through this compressed air exit of the housing of this prior art air line lubricator, and which also insures a continuity of this controlled delivery of compressed airflow and oil, even though an unwanted short delivery time of more overall compressed airflow might occur, comprises:

an oil and overall airflow pick up passageway structure adapted to be arranged within the pre-departure mixing basin of a housing of this prior art air line lubricator which has a continuous uniform diameter, and which will direct the oil and overall airflow, from near a bottom of the pre-departure mixing basin of the housing up to a compressed air exit of the housing of the prior art air line lubricator and then through this compressed air exit of the housing of what will then be a modified air line lubricator.

11. An added modification structure, as claimed in claim 10, comprising, in addition, a delivery passageway structure, having the same uniform diameter of the oil and overall airflow pick up passageway structure that is installed in the housing of this prior art air line lubricator, and a means to join these passageway structures to deliver oil and overall airflow to a location of a tool and a workpiece.

12. An added modification structure, as claimed in claim 11, comprising, in addition, a nozzle to direct oil and overall airflow to a tool just above a workpiece surface, and a means to join this nozzle to the delivery passageway structure.

13. An added modification structure, as claimed in claim 12, comprising, in addition, a valve to start and to stop flow of oil and overall airflow leaving the delivery passageway structure before reaching the nozzle, and means at each end of the valve to join this valve to the nozzle and to the delivery passageway structure.

14. An added modification structure, as claimed in claim 13, wherein in claim 13, there is a nozzle, described in this claim 14 as being the first nozzle, comprising, in addition, a tee fitting secured to the valve to divide the flow of oil and overall airflow leaving the valve, and a means to join this tee fitting to the valve, and two additional divisional passageway structures of equal diameter, to receive equal portions of the flow of oil and overall airflow leaving the tee fitting, and means to join these two additional divisional passageway structures to the tee fitting, and a second nozzle to join with the first nozzle to direct the respective equal portions of the flow of oil and the overall airflow to a tool just above a workpiece surface, and means to join this second nozzle to one of the additional divisional passageways, the first nozzle and means thereof joining the first nozzle to the other additional divisional passageway.

15. An added modification structure, as claimed in claim 14, comprising, in addition, a rifle like spiral grooving structure in the tee fitting to cause the entering flow of oil and the overall airflow to flow in a spiral flow, which more uniformly divides into the divided flows of oil and the overall airflow which flow through the respective two additional divisional passageway structures.

16. An added modification structure, as claimed in claim 10, wherein the oil and overall airflow pick up passageway structure has an inside diameter in the range of one sixteenth to three sixteenths of an inch.

17. An added modification structure as claimed in claim 11, wherein the delivery passageway structure has an inside diameter in the range of one sixteenth to three sixteenths of an inch.

18. A lubrication system to lubricate tools and workpieces, as claimed in claim 1, wherein the oil and overall airflow pick up passageway structure has an inside diameter in the range of one sixteenth to three sixteenth of an inch.

19. A lubrication system to lubricate tools and workpieces, as claimed in claim 2, wherein the delivery passageway structure has an inside diameter in the range of one sixteenth to three sixteenths of an inch.

20. A lubrication system to lubricate tools and workpieces, as claimed in claim 2, wherein the delivery passageway structure has an outside diameter of one eighth of an inch.

* * * * *